June 27, 1967 O. STEMME 3,328,783

MOSAIC THIN FILM STORAGE MEANS

Filed Dec. 11, 1964 3 Sheets-Sheet 1

INVENTOR
Otto Stemme

BY Spencer & Kaye

ATTORNEYS

June 27, 1967 O. STEMME 3,328,783

MOSAIC THIN FILM STORAGE MEANS

Filed Dec. 11, 1964 3 Sheets-Sheet 2

INVENTOR
Otto Stemme
BY Spencer & Kaye
ATTORNEYS

June 27, 1967 O. STEMME 3,328,783

MOSAIC THIN FILM STORAGE MEANS

Filed Dec. 11, 1964 3 Sheets-Sheet 3

INVENTOR
Otto Stemme
BY Spencer & Kaye
ATTORNEYS

United States Patent Office 3,328,78

Patented June 27, 196

3,328,783

MOSAIC THIN FILM STORAGE MEANS

Otto Stemme, Ulm (Danube), Germany, assignor to Telefunken Patentverwertungs-G.m.b.H., Ulm (Danube), Germany Filed Dec. 11, 1964, Ser. No. 417,601
Claims priority, application Germany, Dec. 13, 1963, T 25,252
7 Claims. (Cl. 340—174)

The present invention relates generally to storage mediums, and, more particularly, to a storage cell which comprises thin ferromagnetic films with uniaxial anisotropy of magnetization and over which the write and read lines pass.

It is known to use thin ferromagnetic films, particularly of the composition 80% nickel—20% iron, for the storage of the binary "one" and "zero," with these digits hereinafter being denoted by "L" and "O," respectively. For this purpose, the films are produced with a uniaxial anisotropy so that, in the absence of an external field, the magnetization can only assume two anti-parallel positions in the privileged axis. The binary digits L and O are respectively allocated to these two positions. Write and read lines pass over the film. The writing is effected by bringing the magnetization in the privileged axis A into the position associated with the binary digits L or O respectively by means of the magnetic field of the write lines. For reading, the magnetization is deflected from the stable position by means of the write lines; the resulting signal induced in the sense line, that is to say its polarity, indicates the binary digit L or O which is stored. The individual cells of a store are arranged in the form of a matrix in one plane on a plate. The conductors are placed over the individual film cells to form rows and columns in this matrix so that a cell in which the quantity of information of one bit can be stored is at the point of intersection of each of the rows and columns.

Apart from the storage matrix, which comprises individual film cells, an arrangement is known wherein a coherent film is used on a storage plate. The storage cells then form, under the influence of the switching fields, below the point of intersection of each two switching lines, namely the point of intersection between the rows and columns.

In both known store arrangements, the quantity of information of one bit is stored in a coherent region of the film below a point of intersection. In the known arrangements, the film cells are "interrogated" individually in succession or several at a time for the writing or reading. The first method is termed coincidence interrogation and the second word interrogation. A single cell is interrogated by the two coordinates, namely the row and column, while a word is interrogated by the row and simultaneously by all the columns in which the cells for the word in question lie. The two known methods of interrogation will be explained in more detail below with reference to FIGURES 1 and 2 of the accompanying drawings.

Figures 1A, 1B:
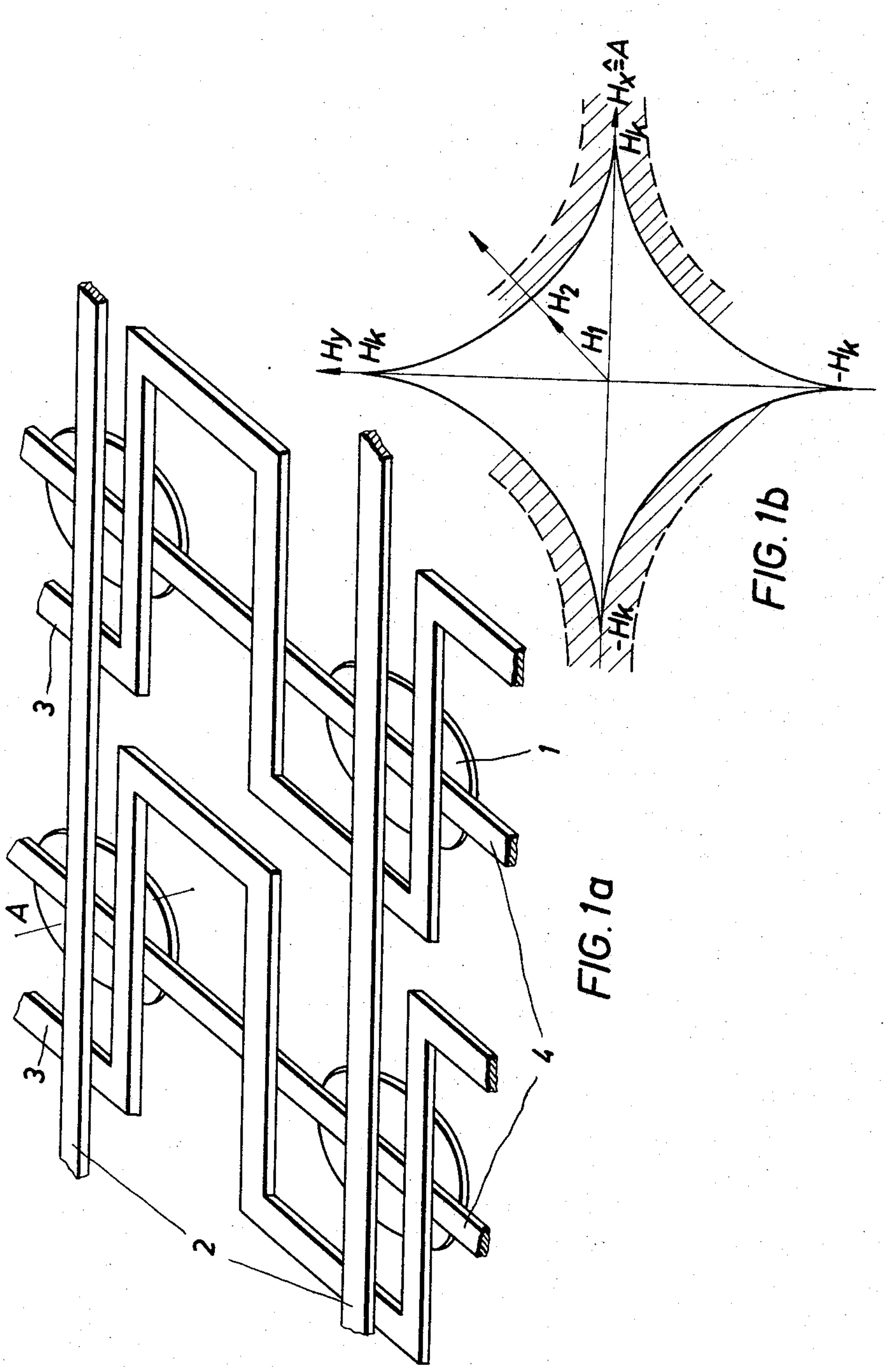

The coincident-current method is a half-current method known from the core storage art. A corresponding arrangement is illustrated diagrammatically in FIGURE 1*a*. The mode of operation of this arrangement can be explained with reference to the "critical curve" illustrated in FIGURE 1*b*. As FIGURE 1*a* shows, row lines 2, column lines 3, and sense lines 4 extend over the individual film cells 1 so that the film cells are below the points of intersection of the row lines 2 and sense lines 4, the column lines 3 being arranged in such a manner that they pass over the film cells 1 parallel with the row lines 2 at these points of intersection. A reversal of the magnetization of a film cell 1 takes place as soon as tl field strength vector acting on the film reaches a poi on the astroid shown in FIGURE 1*b*, described by tl equation:

$$H_x^{2/3}+H_y^{2/3}=H_k^{2/3}$$

It is assumed that the magnetization lies in the —H direction, for example, and the row line produces a fiel $H_1$. If coincidence now occurs at any cell, the field H of a column line is added to $H_1$, and the resulting fiel strength vector extends outside the astroid in the regio of rapid coherent rotational switching as desired.

Unfortunately, the films previously used do not hav the ideal behavior explained. Thus even very low value of a field $H_1$, which are still far removed from th astroid curve, are sufficient to reverse the magnetizatio of the film by boundary phenomena, if the fields $H_1$ ar applied in pulse form. This disturbing effect makes th use of the cheap coincidence method, known from th core-storage art, practically impossible. To this must b added the appearance of the slow incoherent rotationa switching which takes place in a region which is indicatec by hatching in FIGURE 1*b*. This slow incoherent rotational switching is caused by the wave-shaped course o the magnetization in thin films. As a result of this course different rotational moments act on the individual spins in the film because of the different angle with respect to the switching field, so that the magnetization of individual domains of the film is no longer rotated at the same speed and phase. Thus domain boundaries occur between the differently rotating domains, and the stray fields of these boundaries prevent further rotation in these domains to a great extent so that lower switching speeds are the result.

Figures 2A, 2B:
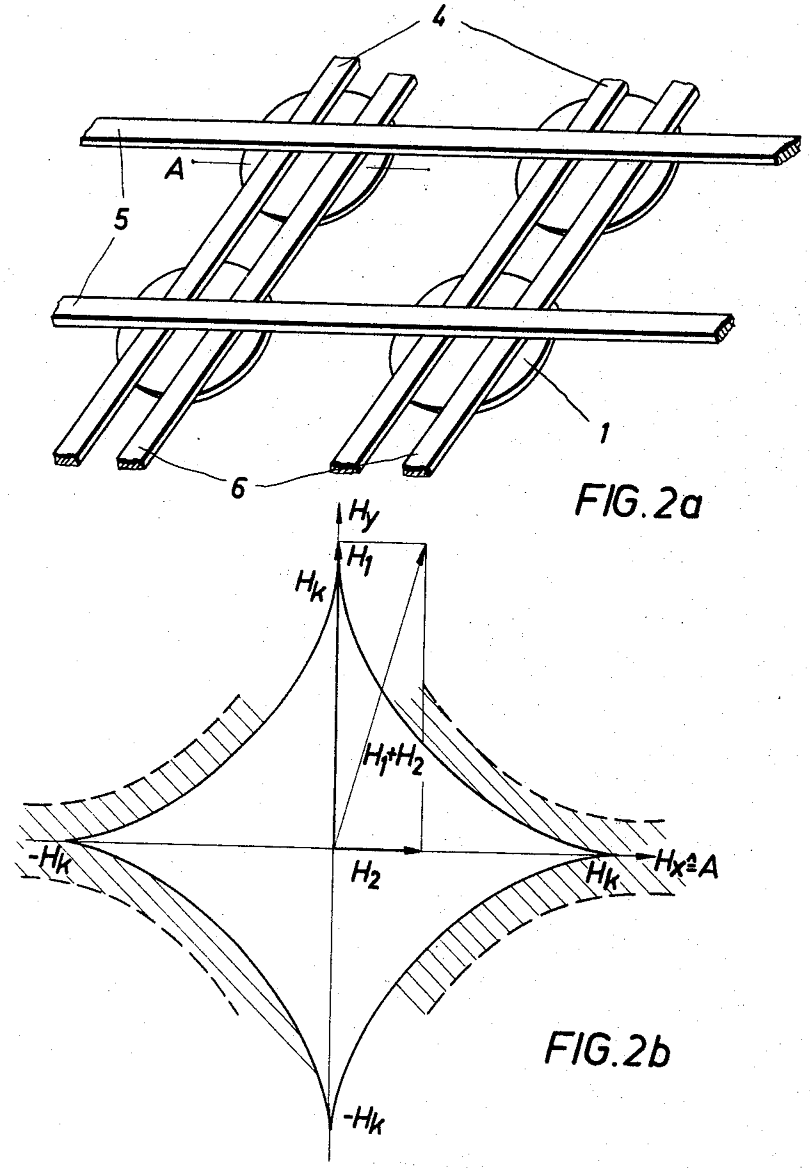

Because the coincident-current method is practically impossible to use for the mentioned reasons, "word interrogation" is used almost exclusively. Its mode of operation will be explained with reference to FIGURE 2. The corresponding arrangement is represented in FIGURE 2*a*. The mode of operation of the arrangement can again be explained with reference to the "critical curve" illustrated in FIGURE 2*b*. As shown in FIGURE 2*a*, the individual film cells 1 are below the points of intersection of the word lines 5 and the bit lines 6 which extend perpendicular thereto, the sense lines 4 being arranged parallel to the bit lines 6. A field $H_1$ is produced by the word lines 5 which field drives the magnetization of the film into a position perpendicular to the privileged axis A, $H_1$ lying outside the astroid. A small bit field $H_2$, which is applied by means of a bit line 6, produces a resulting field vector $H_1+H_2$ which lies in the region of coherent rotational switching and so insures, when the field $H_1$ is switched off, that the magnetization falls in the positive or negative $H_x$ direction. As a result, a binary digit L or O is written. For reading, the magnetization is driven by the field $H_1$ out of the privileged axis A into the position perpendicular thereto. The polarity of the signal obtained in the sense line 4 decides whether a binary digit L or O was stored. With this method, however, the fields $H_2$ cannot be reduced as desired. The reason for this lies in the fluctuation in the magnetization already mentioned. The rotation of the magnetization by $H_2$ must therefore be greater than the fluctuation of the magnetization. Higher values of $H_2$, on the other hand, lead to reversal of the magnetization by boundary processes already mentioned. To this must be added the fact that spurious signals produced by the bit pulses in the sense line 4 increase with the field $H_2$. The cycle time of a store, which can be obtained, is essentially determined, however, by the decay time of this spurious signal in the sense line 4.

'rom what has been said so far, it will be appreci- l that the appearance of boundaries in thin ferromag- .c films and the reversal of magnetization by boundary cesses makes the use of such films unsatisfactory for ·ing purposes in the known arrangements.

Vith these defects of the prior art in mind, it is the in object of the present invention to provide a storage . of thin ferromagnetic films wherein the occurrence boundaries is largely avoided.

Another object of the invention is to provide struc- e for a storage cell in which a disturbance does not troy the information stored therein.

These objects and others ancillary thereto are accom- shed according to the preferred embodiments of the ention wherein the storage cell is constructed in the m of a mosaic film, the mosaic elements of which : preferably square and have a maximum undimen- nal extent, i.e., the maximum dimension in any di- :tion of about half the wave-length of the magnetiza- n wave. The rectangular, preferably square shape of the )saic elements has proved a particularly favorable em- diment. However, the mosaic elements have other apes provided that their maximum extent lies sub- intially in the order of magnitude of half the wave- igth of the magnetization wave-length, namely about 10 20μ. Thus, they may have the shape of an ellipse, r example, the major axis of which lies within the above der of magnitude.

Additional objects and advantages of the present inven- )n will become apparent upon consideration of the llowing description when taken in conjunction with e accompanying drawings in which:

FIGURE 1*a* is a perspective view of a prior art ar- .ngement.

FIGURE 1*b* is a diagram indicating certain charac- ristics of this arrangement.

FIGURE 2*a* is a perspective view of another prior :t arrangement.

FIGURE 2*b* is a diagram indicating certain charac- :ristics of this arrangement.

Figure 3A:
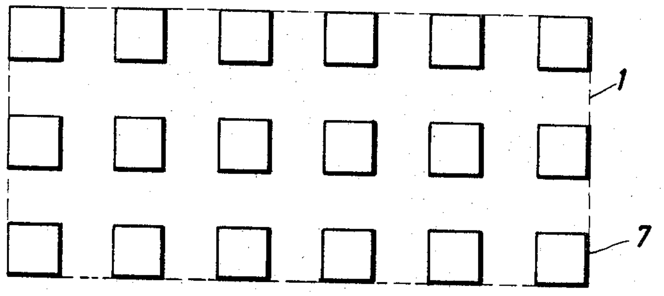

FIGURE 3*a* is a schematic plan view of one embodi- ient of the present invention.

Figure 3B:
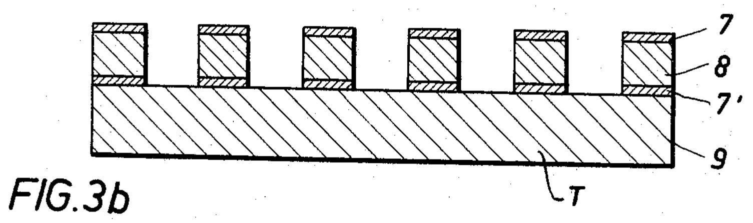

FIGURE 3*b* is a schematic sectional view through the tructure shown in FIGURE 3*a*.

Figure 4A:
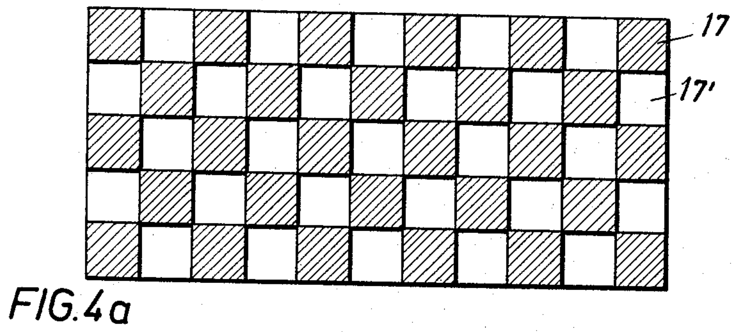

FIGURE 4*a* is a schematic plan view of another em- odiment of the present invention.

Figure 4B:
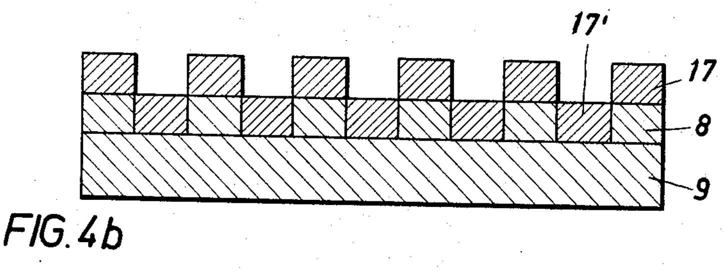

FIGURE 4*b* is a schematic sectional view through he structure shown in FIGURE 4*a*.

Before considering the drawings showing the present nvention in more detail, it shall be noted that the listurbing boundaries occur in thin ferromagnetic films )articularly as a result of the above-mentioned wave tructure of the magnetization called "rippling". When ı field is applied to reverse the magnetization, the am- plitudes of the waves are increased so that finally bound- aries occur. The development of these boundaries is avoided in the storage cell according to the invention.

The avoidance of boundary development in the storage cell according to the invention has the further effect that as a result of the absence of stray fields from the boundaries the incoherent rotational switching now takes place at the same high speed as the coherent rotational switching; the switching times are of the order of magnitude of $10^{-9}$ sec.

In order to insure that a mosaic element comprises a magnetic elemental domain, the demagnetization factor of the film cells must be kept low. Therefore, a favorable embodiment of a storage cell according to the invention is characterized in that the thickness of the mosaic film is very small. It is about 150 A. for example, if the spacing between the mosaic elements corresponds substantially to the length of the edges of the elements.

In order to obtain the largest possible read voltages in the read line in this case, it has further proved an advantage for the mosaic film to comprise a plurality of ferromagnetic films vapor-deposited one on top of the other and separated from one another by non-magnetic intermediate films. These non-magnetic intermediate films may comprise conducting or non-conducting material.

The thickness of the ferromagnetic mosaic film may, however, be substantially greater if the spacing between the mosaic elements is reduced. In this case, it is also possible not to arrange all the mosaic elements in one plane, but to raise some of the mosaic particles out of the common film plane in relation to the adjacent mosaic elements.

An embodiment of the storage cell according to the invention in which the mosaic elements are arranged in a checkerboard-like manner in one plane has proved particularly favorable. It is also possible to arrange a plurality of such film planes one above the other, the individual film planes being staggered in relation to one another in such a manner that magnetic mosaic elements and non-magnetic intermediate elements come to lie alternately one on top of the other.

Whereas boundaries may also occur through the formation of magnetic reversal nuclei in conventional films which are coherent over relatively large regions, this is scarcely possible in films composed of small mosaic elements according to the invention.

With more particular reference to the drawings showing the invention, FIGURES 3*a* and 3*b* illustrate a storage cell according to the invention in plan and in section respectively. The storage cell comprises a large number of square ferromagnetic mosaic elements 7 and 7' which are separated from one another by non-magnetic intermediate films 8. These mosaic elements are applied to a carrier plate T, for example by vapor deposition. The spacing of the indvidual mosaic elements corresponds, in this example, to the length of the edges of the mosaic elements. In this case, the thickness of the ferromagnetic mosaic film 7 or 7' amounts to about 150 A., while the thickness of the non-magnetic intermediate film 8 is of the order of magnitude of the length of the edges of the mosaic elements.

A further example of a storage cell according to the invention is illustrated in plane and in section in FIGURES 4*a* and 4*b* respectively. It comprises two film planes applied one above the other to a carrier plate 9, the square ferromagnetic mosaic elements 17 and 17' being arranged in each plane in checkerboard formation so that adjacent mosaic elements meet at the corners. In the lower film plane, the spaces between the ferromagnetic mosaic elements 17' are filled with non-magnetic intermediate elements 8 on which the ferromagnetic mosaic elements 17 in the upper film plane come to lie. With such an arrangement, the thickness of the ferromagnetic mosaic film 17 or 17' can be considerably greater than in an arrangement as shown in FIGURES 3*a* and 3*b*.

The production of such a storage cell according to the invention is preferably effected in such a manner that the non-magnetic intermediate elements 8 are first vapor-deposited on the carrier plate 9 through a net-like mask. Alternatively, these intermediate elements 8 may be obtained by applying to the carrier plate 9 a non-magnetic film, which is at first coherent, and by producing the interspaces by photo-etching. Then a ferromagnetic film is vapor-deposited on the whole plate so that the ferromagnetic mosaic elements 17 and 17' are formed.

For example, the carrier plate 9 of such a storage cell according to the invention consists of a glass plate or a polished metal plate; the ferromagnetic mosaic elements 17 and 17' consist of Permalloy (80% nickel—20% iron) and have a thickness of 500 A and a length of the edges of 20μ, corresponding to about half the wave-length of the magnetization wave, which is measurable by means of an electron microscopic device; the non- magnetic intermediate elements 8 consist ofcopper, aluminum or silicon oxide and have also a thickness of 500 A and a length of the edges of 20$\mu$.

A storage plan with such mosaic films according to the invention, comprises the indvidual mosaic films and the write and read lines which are placed over it in the usual manner, how it is well known in the art, for example as shown in FIGURE 1*a* or FIGURE 2*a*. Each individual film cell 1 in FIGURE 1*a* or FIGURE 2*a* consists now of a storage cell according to the invention, illustrated in FIGURES 3*a*, 3*b* and 4*a*, 4*b*. But it is also possible, to use a large region consisting of a very large number of elements forming a coherent mosaic film instead of individual mosaic film cells 1. In this case the storage cells are formed automatically under each point of intersection of the write and read lines. These lines generally have a width of about 1 mm. so that a very large number of film elements, for example 400, come to lie under each point of intersection. Thus the information quantity of one bit is no longer stored in a coherent film region, but in a large number of very small film elements according to this invention.

A particular advantage of this arrangement according to the invention is that a disturbance in one or more of these elements below a point of intersection cannot lead to a mutilation of the whole information so that the reliability of the storage arrangement according to the invention is substantially greater than in the known arrangements for this reason alone. Above all, the arrangement according to the invention permits the use of the favorable coincidence-current method because now no inadmissible boundary processes can take place. With the word interrogation methods, too, these processes can no longer be initiated by bit fields.

It will be understood that the above description of the present invention is susceptible to various modifications, changes, and adaptions, and the same are intended to be comprehended within the meaning and range of equivalent of the appended claims.

What is claimed is:

1. A storage cell comprising a mosaic film, of thin ferromagnetic material having uniaxial anisotropy of magnetization and over which write and read lines are to pass the mosaic film being constructed of magnetic film elements which have a maximum unidimensional extent of about half the wave-length of the magnetization wave and which are separated by substantially non-magnetic film elements.

2. A storage cell as defined in claim 1 wherein the thickness of the magnetic film elements of the mosaic film is about 150 A.

3. A storage cell as defined in claim 1 wherein the mosaic film comprises a plurality of ferromagnetic films vapor-deposited one above the other and separated from one another by non-magnetic intermediate films.

4. A storage cell as defined in claim 1 wherein the mosaic elements are arranged in checkerboard formation in one plane.

5. A storage cell as defined in claim 4 wherein a plurality of such film planes are arranged in staggered relationship one above the other.

6. A storage cell as defined in claim 1 wherein said elements are square.

7. A storage cell comprising a mosaic film of thin ferromagnetic material having uniaxial anisotropy of magnetization and over which write and read lines are to pass, said mosaic film being constructed of magnetic film elements which are separated by substantially non-magnetic film elements such that a single bit of information is stored in a plurality of said magnetic film elements.

No references cited.

BERNARD KONICK, *Primary Examiner.*

JAMES W. MOFFITT, *Examiner.*